United States Patent [19]

Sung

[11] Patent Number: 4,941,061

[45] Date of Patent: Jul. 10, 1990

[54] NOISE-FREE SKIP SEARCH APPARATUS UTILIZING A PIEZO-ELECTRIC ELEMENT

[75] Inventor: Sun K. Sung, Seoul, Rep. of Korea

[73] Assignee: Gold Star Co., Ltd., Seoul, Rep. of Korea

[21] Appl. No.: 948,158

[22] Filed: Dec. 31, 1986

[30] Foreign Application Priority Data

Dec. 31, 1985 [KR] Rep. of Korea ............... 18422/1985

[51] Int. Cl.$^5$ ...................... A04N 5/783; G11B 21/10
[52] U.S. Cl. .................................. 360/10.2; 360/77.16; 360/10.3
[58] Field of Search ...................... 360/10.2, 77, 10.3, 360/70, 78, 75

[56] References Cited

U.S. PATENT DOCUMENTS

| | | | |
|---|---|---|---|
| 4,558,376 | 12/1985 | Heitmann | 360/10.2 |
| 4,665,449 | 5/1987 | Koyuki | 360/10.2 |
| 4,680,648 | 7/1987 | Takayama | 360/10.2 |

*Primary Examiner*—Alan Faber
*Attorney, Agent, or Firm*—Birch, Stewart, Kolasch & Birch

[57] ABSTRACT

A noise-free skip search apparatus utilizing a piezo-electric element wherein no noise appears on the screen at the high reproducing speed of a VCR. In the apparatus, a piezo-electric element is shifted according to a multiple angular speed for controlling the angle of reproducing head. The apparatus can remove a color crosstalk phenomenon thereby.

5 Claims, 5 Drawing Sheets (A) Reproducing Direction of Head (B)

(C)

Position Of Noise Band (A)

(B)

(C)

NOISE-FREE SKIP SEARCH APPARATUS UTILIZING A PIEZO-ELECTRIC ELEMENT

BACKGROUND OF THE INVENTION

This invention relates to a noise-free skip search apparatus utilizing a piezo-electric element wherein no noise appears on the screen by performing a skip search at the high reproducing speed of a video cassette tape recorder (VCR).

Generally, at the high reproducing speed or low reproducing speed of a VCR, some noise bands appeared on a monitor. Accordingly, the prior art apparatus did not allow noise bands to appear on the monitor by using three heads at the low reproducing speed. However, such conventional apparatus was unable to obtain a clean image reproduction without any noise bands at the high reproducing speed. Specifically, at the high reproducing speed, as a head switching pulse signal as shown in (B) of FIG. 1 is applied, the reproducing heads A and B play across various tracks as shown in (A) of FIG. 1. Therefore, this caused noise bands to appear as shown in (C) of FIG. 1 in reproducing the adjacent tracks which are recorded at a different angle from the azimuth angle of heads.

Accordingly, in order to solve this by means of a simplified method, it was possible to reproduce the image on the screen without noise signals by simultaneously moving the heads whose azimuth angle is different from each other, during the difference of several horizontal scan lines H (1H is equal to 63.5 μsec); and then by combining the radio frequency (RF) signal which is read at each head along a time axis. Specifically, as a head switching pulse signal as shown in (B) of FIG. 1 is applied, two radio frequency waveforms reproduced at the advancing heads A and B' and the retarding heads B, A' are obtained as shown in (C) and (D) of FIG. 2 respectively; and then said two waveforms are combined as shown in (E) of FIG. 2, so that no noise bands occur on the screen. However, this method has a drawback in that a color crosstalk phenomenon due to the interference between said two signals in each portions in which two high frequency waveforms are crossed, occurs as shown in (E) of FIG. 2, so that a color stain appears on the screen.

OBJECT OF THE INVENTION

Accordingly, it is an object of the present invention, which is suggested in order to remove the above described drawback of the prior art, to provide a skip search apparatus wherein a piezo-electric element is shifted according to a multiple angular speed for controlling the angle of the reproducing head, so that noise bands and also color crosstalk phenomenon do not occur at the high reproducing speed.

BRIEF DESCRIPTION OF THE DRAWINGS

This and other objects and features of the present invention will become more apparent as the detailed following explanation of an embodiment of this invention is considered with reference to the accompanying drawings wherein.

DETAILED DESCRIPTION OF THE INVENTION

Generally, the angle ($\theta$) of the playing head to the tape during normal operation is smaller than that in an advancing search mode. The former angle $\theta$ is expressed by the following equation:

$$\theta = \text{Arctan}\left( \frac{W}{\frac{\pi \cdot D}{2} \cdot \cos\theta_o - \frac{V_t}{f_v} \cdot n} \right) \quad 1.$$

in which W is a effective thickness of video tape; D is a diameter of drum; $\theta_o$ is an angle of the playing head with reference to the tape in the stop mode (it is about 5° 56′ 7″ for VHS system); $V_t$ is a playing distance of tape per second; n is a constant number representive of multiple speed; and $F_v$ is a vertical synchronization frequency.

Also, said angle $\theta$ is disclosed in the following table for a VHS system.

TABLE I

| | Magnitude of multiple speed | | |
|---|---|---|---|
| Type of Mode | −9 multiple speed (SPN −3 multiple speed) | One multiple speed | 9 multiple speed (SPN 3 multiple speed) |
| SP (standard) Mode | 5.836° | 5.97° | 6.049° |
| EP (long period) Mode | 5.836° | 5.95° | 6.039° |

Figure 1:
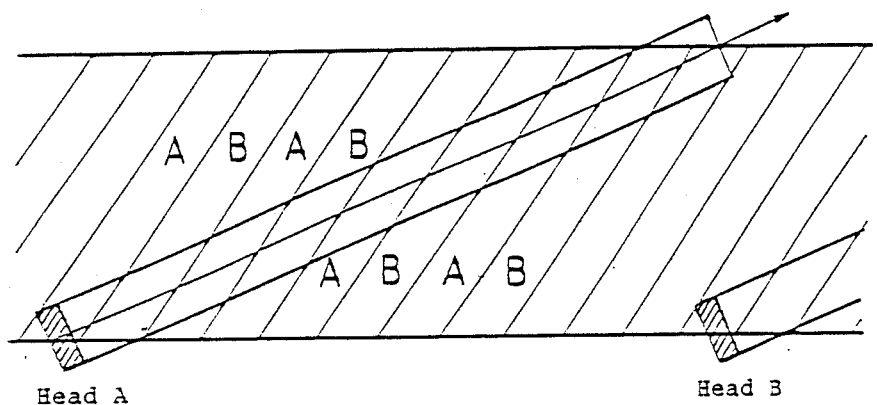
FIG. 1, (A)–(C), shows the track and waveform of a reproducing head with reference to the prior art track at the high speed reproducing speed, FIG. 2, (A)–(E), shows the track and waveform of the prior art noise-free search according to a radio frequency envelope combining method, FIG. 3 (A)–(C) shows the track and waveform of the noise-free search according to the present invention.
Figure 1:
Figure 1:
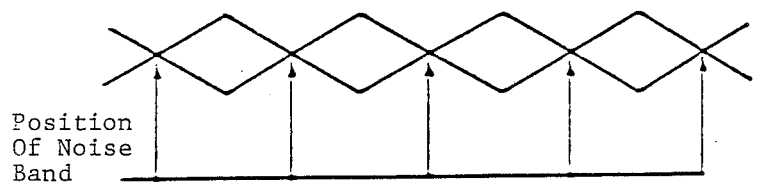
Figure 2:
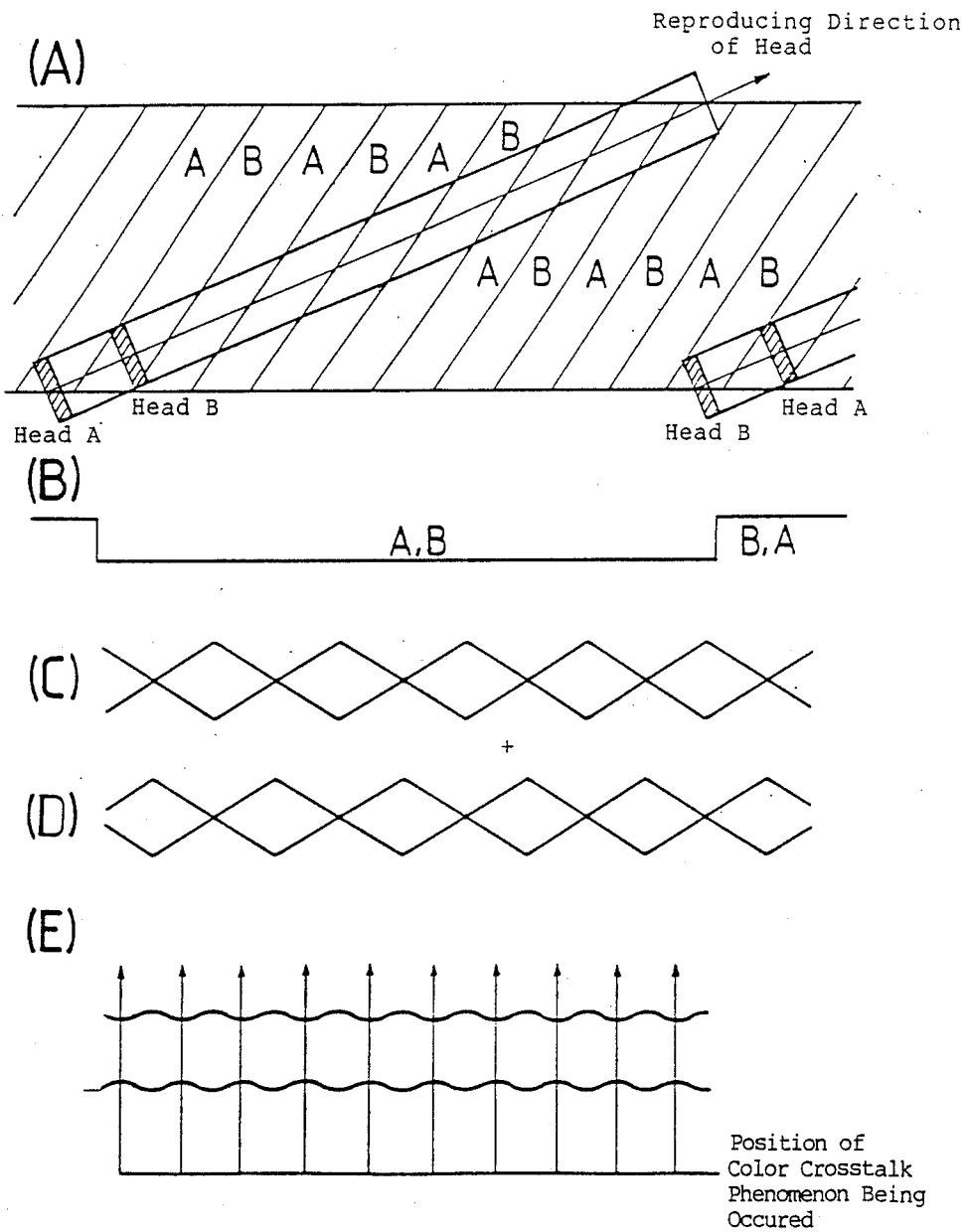
Figure 3:
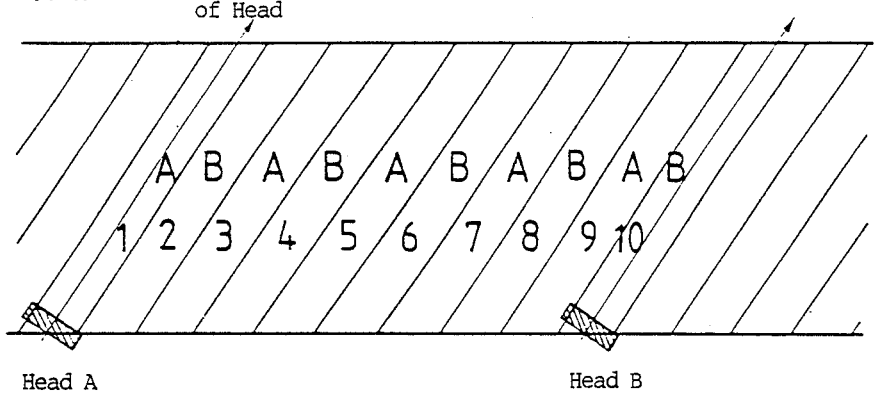
Figure 3:
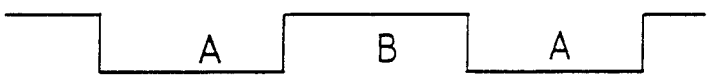
Figure 3:
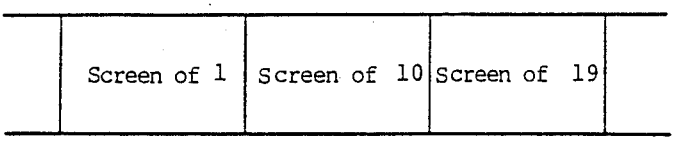
Figure 4:
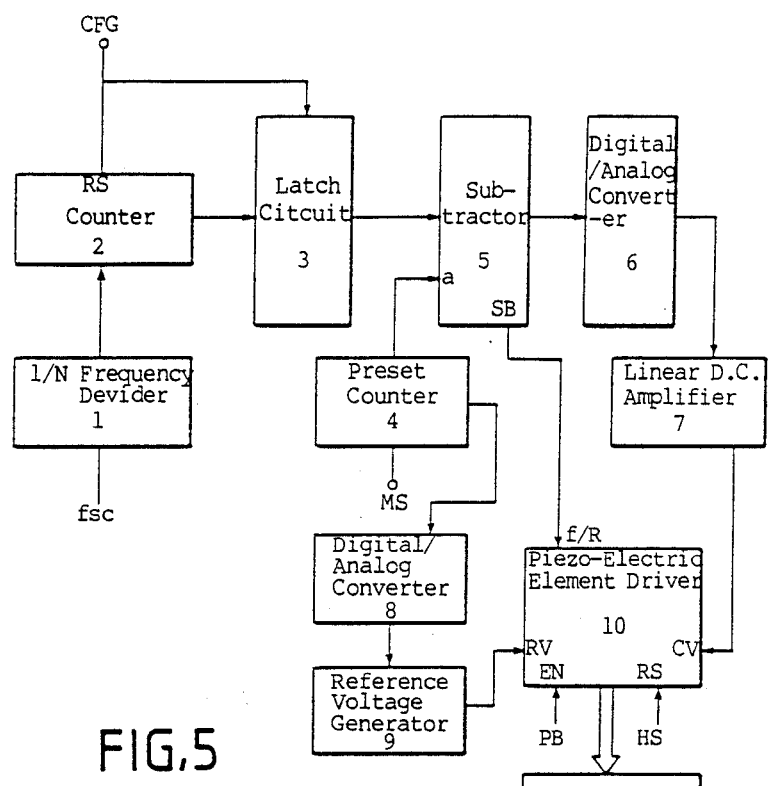
FIG. 4 is a block diagram of a noise-free skip search apparatus in accordance with the present invention.

As shown in equation (I) and table I, the angle $\theta$ becomes greater as the multiple speed becomes faster in a forward (+) direction. This means that the angle of the head is fixed according to each multiple speed. Accordingly, for the 9 multiple speed in a forward direction if the angle of head is increased by nine times, then the track of head is changed as shown in FIGS. 3 and 4 to permit a skip search without any noise on the screen. In this case, in order to correct the angle of head, the head itself must be shifted. In other words, in the prior art the shift of the head is impossible because the head is used by fixing it to the drum, while in the present invention the shift of head due to the movement of the piezo-electric element is permitted by adapting the technique of overlying the head on the piezo-electric element.

Hereinafter, the present invention as described above will be explained in further detail referring to FIG. 4.

FIG. 4 is a detailed block diagram of the skip search apparatus according to the present invention, in which the output terminal of a 1/N frequency divider 1 for dividing a clock pulse signal fsc (which is 3.58 or 4.43 MHz) is connected to the count input of a counter 2, and a capstan pulse generating signal CFG generated according to the rotation of capstan motor is connected to the reset terminal RS of said counter 2. The count output of said counter 2 is connected via a latch circuit 3 to the comparison input terminal b of a subtractor 5, and the count output of a preset counter 4 which applies a mode selection signal MS to said count input, is connected to the reference input terminal a of said subtractor 5. Also, the output terminal of said subtractor 5 is connected via a digital to analog converter 6 and a linear d.c. amplifier 7 to the comparison voltage terminal CV of a piezo-electric element driver 10, and the sign bit output terminal SB thereof is connected to the forward/reverse selection terminal F/R of said piezo-electric element driver 10. The output terminal of said preset counter 4 is connected via another digital to analog converter 8 and a reference voltage generator 9 to the reference voltage terminal RV of said piezo-electric element driver 10, and the enable terminal EN and reset terminal RS of said piezo-electric element driver 10 are connected to apply a reproducing button signal PB and a head switching pulse signal HS, respectively, and the output terminal of said piezo-electric element driver 10 is connected to a piezo-electric element with the head attached.

Hereinafter, the operation and effect of the present invention as described above will be explained in detail. Generally, at the performance of search the transfer speed of tape becomes rapid by rotating the capstan motor at a high speed to obtain a desired multiple speed. When the capstan motor is rotated, a capstan pulse generation signal CFG is generated and output in response to the rotation of said motor, and this capstan pulse generation signal CFG is applied to the reset terminal RS of counter 2 as a reset signal, which is irrespective of whether the time period when the capstan pulse generation signal CFG is changed from a high level to a low level or the time period when the capstan pulse generation signal CFG is changed from a low level to a high level conversely is used. Further, said capstan pulse generation signal is applied to the latch circuit 3 as a latch pulse signal.

In the meantime, a clock pulse signal fsc is frequency divided by the 1/N frequency divider 1 and then applied to the count input terminal of counter 2 for counting it upwardly. In this manner, the counter 2 counts upwardly the frequency divided signal of 1/N frequency divider 1 and output the same and is reset by a capstan pulse generation signal CFG. The count signal output from the counter 2 is latched at latch circuit 3 by a latch pulse signal from the capstan pulse generation signal and thereafter applied to the comparison input terminal b of subtractor 5 as comparison data.

Further, a constant count value is output at the preset counter 4 by a mode selection signal MS according to the reproducing state, i.e., SP, LP or EP and applied to the reference input terminal a of subtractor 5 as reference data.

Accordingly, the subtraction operation is performed at the subtractor 5, which in turn outputs a high level signal at the high reproducing speed while a low level signal at the low reproducing speed at its sign bit output terminal. The output signal at said sign bit output terminal SB is applied to the forward/reverse selection terminal F/R of piezo-electric element driver 10 to become the reference of whether the changing direction of piezo-electric element must be moved a plus (+) direction or a minus (−) direction with reference to the X axis.

Figure 5:
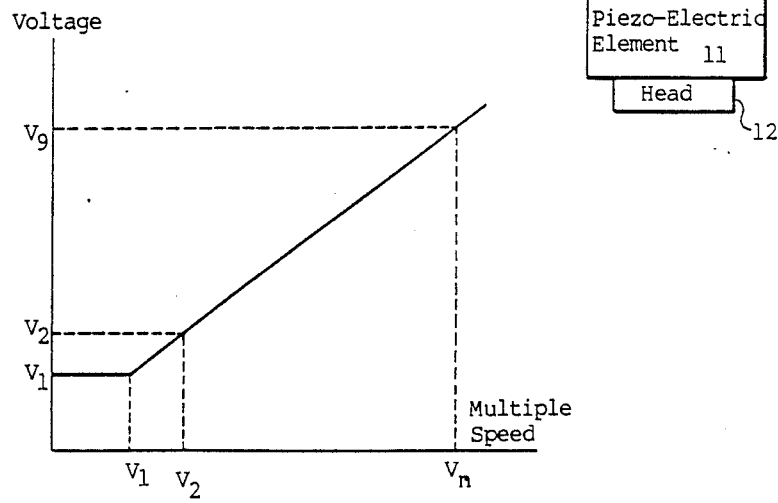
FIG. 5 shows a graph of the target voltage dependent on the multiple speed in FIG. 3, and FIG. 6, (A)–(C), shows an output waveform helpful in understand FIG. 3.

Meanwhile, a digital signal which is subtracted and output at the subtractor 5 is converted to an analog signal at the digital to analog converter 6 and output as a d.c. voltage, and this d.c. voltage is amplified at the linear d.c. amplifier 7 to apply to the comparison voltage terminal CV. The characteristic of the voltage applied at this comparison voltage terminal CV (which is referred to as a target voltage) is varied in proportion to each multiple speed as shown in FIG. 5.

Further, the output data signal of said preset counter 4 is converted to an analog signal at the digital to analog converter 8 and output as a d.c. voltage, and this d.c. voltage is applied via the reference voltage generator 9 to the reference voltage terminal RV of piezo-electric driver 10 as a reference voltage.

The piezo-electric element driver 10 in the reproducing mode is driven by being enabled only in such a state that the reproducing push button signal PB is applied.

Accordingly, the reference voltage applied to the reference voltage terminal CV of piezo-electric element driver 10 at the normal reproducing speed operation is set to be equal to a target voltage applied to the comparison voltage terminal CV thereof, so that the piezo-electric element (11) is not moved to the central position.

Figure 6:
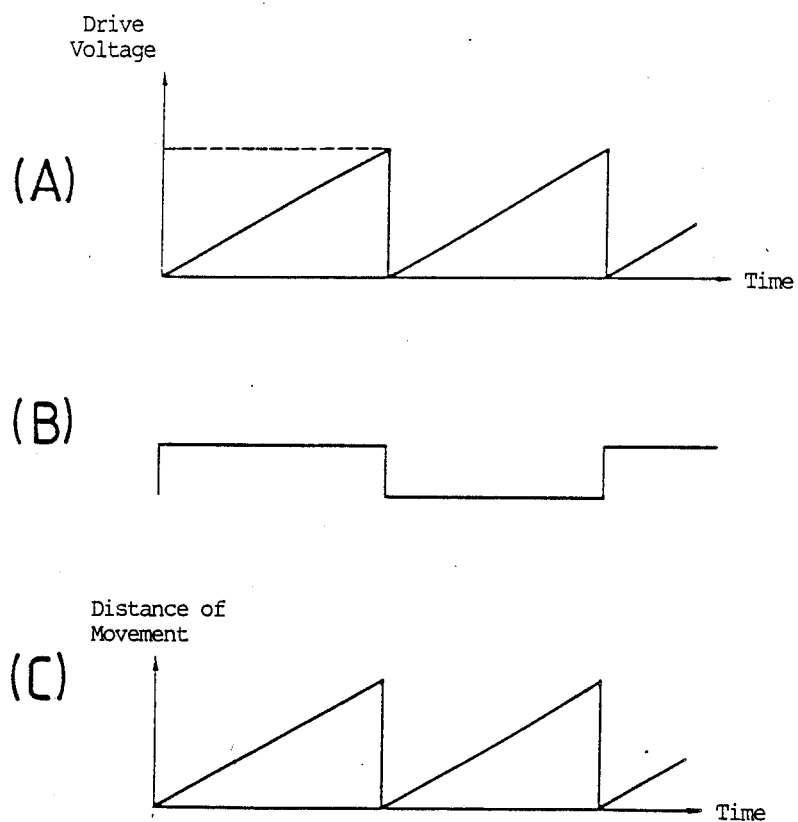

On the other hand, for a multiple speed reproducing operation the target voltage according to each multiple speed is applied to the comparison voltage terminal CV of piezo-electric element driver 10 as described above and compared with the reference voltage, so that a drive voltage as shown in (A) of FIG. 6 is output from the piezo-electric element driver 10 and applied to the piezo-electric element 11, and therefore the piezo-electric element 11 is moved in the plus (+) direction or the minus (−) direction in proportion to said drive voltage. Herein, the movement variation of piezo-electric element 11 is determined by the time period of the variation of head (from A to B or from B or A). That is, the reference of variation point is determined by a head switching pulse signal as shown in (B) of FIG. 6.

Further, during a recording operation a reproducing button signal PB is not applied and thus the piezo-electric element driven 10 is not driven, so that the piezo-electric element 11 is disposed in the central position, thereby allowing compatability between the tapes at the recording.

According to the present invention as described above, noise bands and a color crosstalk phenomenon does not occur since the angle of reproducing head is controlled by shifting the piezo-electric element in proportion to each multiple speed reproducing operation, thereby providing a clean, noise-free screen in any multiple speed corresponding to the search.

What is claimed is:

1. A noise-free skip search apparatus utilizing a piezo-electric element attached to and controlling the position of a rotating head relative to a recording track formed on the tape of a video tape recorder and where the tape is driven at different speeds by a capstan during a plurality of reproducing speeds comprising:

a pulse counter being reset by a signal generated in response to rotation of the capstan and being further responsive to a pulse signal generated from a clock pulse generator to provide a first pulse output signal;

a latch circuit coupled to the pulse output signal of said counter and being further responsive to said signal generated in response to rotation of the capstan for generating a latched pulse signal;

a signal subtractor circuit having a first or comparison input terminal, a second or reference input terminal, a difference output terminal, and sign bit output terminal;

a preset pulse counter operative in response to a reproducing speed mode select signal to generate a second pulse output signal having a constant count output;

said latched pulse signal and said second pulse output signal being respectively coupled to said first and second input terminals of said subtractor which in turn generates a pulse difference output signal at said difference output terminal and a signal at said sign bit output terminal of a first and second binary signal level for first and second reproducing speeds;

circuit means coupled to said subtractor for generating a first analog output signal corresponding to said pulse difference output signal;

a driver circuit for said piezo-electric element generating a position control signal coupled to said piezo-electric element from an output terminal and having a pair of input terminals, an enabling signal input terminal, a reset input terminal, a forward-/reverse direction input terminal;

circuit means coupled to said preset pulse counter for generating a second analog output signal corresponding to said second pulse output;

circuit means coupled to said second analog output signal for generating an analog reference signal;

said analog reference signal being coupled to one of said pair of input terminals of said driver circuit and said first analog output signal being coupled to the other of said pair of input terminals, said driver circuit comparing said analog signals and generating said position control signal in response thereto when a reset signal is applied to said reset input terminal following an enabling signal being applied to said enabling signal input terminal and a directional input signal being applied to said forward-/reverse direction input terminal.

2. The apparatus as defined by claim 1 wherein said circuit means for generating said first and second analog output signal comprise digital to analog signal converters.

3. The apparatus as defined by claim 2 and wherein said circuit means for generating an analog reference signal comprises a reference voltage generator.

4. The apparatus as defined by claim 1 and additionally including signal amplifier means coupling said first analog signal to said other input terminal of said driver circuit.

5. The apparatus as defined by claim 4 wherein said amplifier means comprises a linear DC amplifier.

* * * * *